United States Patent [19]
Birgmeir et al.

[11] Patent Number: 5,699,451
[45] Date of Patent: Dec. 16, 1997

[54] CORRECTION OF COLOR DEFECTS DURING PRINTING OF PHOTOGRAPHS

[75] Inventors: Klaus Birgmeir, Putzbrunn; Hermann Waibel, Munich, both of Germany

[73] Assignee: AGFA-Gevaert Aktiengesellschaft, Leverkusen, Germany

[21] Appl. No.: 139,428

[22] Filed: Oct. 20, 1993

[30] Foreign Application Priority Data

Nov. 23, 1992 [DE] Germany ............ 42 39 315.9

[51] Int. Cl.⁶ .................................................. G06K 9/46
[52] U.S. Cl. ....................................... 382/167; 358/518
[58] Field of Search ................... 382/17, 167, 254, 382/274, 299, 270; 358/523, 520, 518, 447

[56] References Cited

U.S. PATENT DOCUMENTS

| | | | |
|---|---|---|---|
| 4,335,956 | 6/1982 | Findeis | 355/27 |
| 4,812,903 | 3/1989 | Wagensonner et al. | 358/521 |
| 4,825,297 | 4/1989 | Fuchsberger et al. | 358/447 |
| 4,831,434 | 5/1989 | Fuchsberger | 358/520 |
| 5,065,234 | 11/1991 | Hung et al. | 358/523 |
| 5,068,718 | 11/1991 | Iwabe et al. | 348/645 |
| 5,072,305 | 12/1991 | Numakura et al. | 358/523 |
| 5,233,413 | 8/1993 | Fuchsberger | 358/80 |
| 5,317,427 | 5/1994 | Ichikawa | 358/520 |

FOREIGN PATENT DOCUMENTS

| | | | |
|---|---|---|---|
| 34 08 336 A1 | 9/1984 | Germany | H04N 1/46 |
| 56-141673 | 11/1981 | Japan | H04N 1/46 |

*Primary Examiner*—Leo Boudreau
*Assistant Examiner*—Matthew C. Bella
*Attorney, Agent, or Firm*—Darby & Darby

[57] ABSTRACT

The gray balance of a color copying apparatus is adjusted by generating three sets of test signals respectively representing red, green and blue components of a test image. The test image is modified by operating on each set of signals with a respective characteristic line. The characteristic lines are stored in look-up-tables constituting part of the apparatus. Each characteristic line has a first point corresponding to a first location of the modified test image and a second point corresponding to a second location of the modified test image. A first copy of the test image is made and the red, green and blue densities of the copy at the first location determined. If any of these densities deviates from a reference value, the corresponding characteristic line is adjusted so that the respective density assumes the reference value. A second copy of the test image is now made and the red, green and blue densities of the copy at the second location determined. In the event that one or more of the densities at the second location deviates from a reference value, the associated characteristic line or lines are further adjusted in such a manner that the first point of each characteristic line remains unchanged.

33 Claims, 2 Drawing Sheets

CORRECTION OF COLOR DEFECTS DURING PRINTING OF PHOTOGRAPHS

FIELD OF THE INVENTION

The invention relates to the reproduction of masters.

BACKGROUND OF THE INVENTION

The production of color images on photographic copy material can be accomplished using electronic imaging signals. The imaging signals can be generated, for example, by electronic scanning of a master such as a diapositive.

The imaging signals are subjected to electronic image processing and then converted into a color image, e.g., by way of a cathode ray tube or laser printing device which exposes the copy material. The exposed copy material is developed and dried to yield a color print. The unit employed for electronic image processing is adjustable to different printing conditions such as, for instance, different copy materials or variations in developer chemistry.

Many apparatus for the production of color prints are known. These apparatus generally fall into one of two categories. The first category includes color printers in which a master is reproduced on photographic copy material by means of integral optical imaging. The second category encompasses color printers in which a master is optoelectronically scanned pointwise along columns and rows to generate imaging signals which undergo image processing and are subsequently sent to an output device (a CRT, laser printing device or array of light-emitting diodes) for exposure of copy material. The imaging signals are advantageously divided into three components R, G, B which respectively represent the three primary colors red, green and blue and are processed in three individual channels. It is also possible, for processing of the imaging signals, to subject the R, G and B signals to a transformation, e.g., into luminance and chrominance signals Y, U, V.

In color printers of the second type, the copy material is usually exposed three times, once in each of the primary colors. The quality of the resulting color prints is here strongly dependent on the correctness of the amounts of light to which the copy material is exposed.

The U.S. Pat. No. 4,335,956 discloses a method in which the operating condition of a printer and a downstream developing unit are checked by copying and evaluating calibrating masters (gray scales). If the density of a copy in one or more colors at certain shades of gray deviates from a reference value, it can be concluded that a flaw exists in the printer or developing unit. In such a case, compensation can be achieved by exposing for different lengths of time in the three color channels so that the required result (uniform gray) is obtained. For a density-dependent copy material, i.e., a copy material which requires different proportions of color during exposure to achieve a neutral gray at different densities, measurements at more than one shade of gray can be used to find an adjustment better than that which can be obtained by evaluating only a single shade of gray. However, the density-dependence cannot be entirely eliminated, that is, cannot be eliminated for all shades of gray.

The German publication 40 02 298 teaches an apparatus in which the imaging signals derived from an electronically scanned master are modified in order to correct color casts. The imaging signals are categorized by intensity intervals and classified as color dominant or color nondominant. Correction is accomplished by an analysis of the imaging signals. Color defects such as, for example, color casts, due to photography can be corrected in this manner but not color defects arising in the processing line downstream of the correction unit, e.g., color defects caused by printing of the copy material. Color reproduction on the copy material generally deviates from the color represented by the imaging signals of the respective color channels. The reason is that the color sensitivity of the copy material is density-dependent. In particular, manufacturing tolerances for the copy material, as well as variations in developer chemistry, then lead to undesired color defects in the color prints.

SUMMARY OF THE INVENTION

It is an object of the invention to provide a method which allows the quality of a copy to be improved.

Another object of the invention is to provide a method which makes it possible to reduce or eliminate color defects in a copy produced from imaging signals even when the defects arise because of apparatus or process fluctuations following processing of the signals.

An additional object of the invention is to provide an apparatus which enables better copy quality to be achieved.

A further object of the invention is to provide an apparatus which permits color defects in a copy generated from imaging signals to be reduced or eliminated even though the defects may be caused by apparatus or process fluctuations downstream of a processing unit for the signals.

The preceding objects, as well as others which will become apparent as the description proceeds, are achieved by the invention.

One aspect of the invention resides in a method of adjusting a copying apparatus, particularly a copier for making copies on photographic color copy material. The method comprises the steps of generating at least one set of test signals each of which represents a discrete location of a predetermined test image, and operating on the test signals with at least one preselected characteristic line to modify the predetermined test image. The preselected characteristic line has a first point corresponding to a first location of the modified test image and a second point corresponding to a second location of the modified test image. The method further comprises the steps of comparing the value of a predetermined characteristic, e.g., the density, of the modified test image at the first location with a reference value; comparing the value of the predetermined characteristic at the second location with a reference value; and altering the preselected characteristic line when the respective values for the first location are substantially equal and the respective values for the second location are unequal. The altering step is performed in such a manner that the first point of the preselected characteristic line remains substantially unchanged.

It is possible to carry out the altering step so that precisely three points of the preselected characteristic line remain unchanged during the altering step.

The preselected characteristic line may correspond to one of the primary colors red, green and blue. In such an event, the preceding steps can be performed for the other two primary colors using respective additional characteristic lines. Here, it is preferred for the first point of the preselected characteristic line to be common to all of the characteristic lines. One or more of the characteristic lines can be nonlinear.

The method can also comprise the steps of making a copy of the modified test image, and deriving at least one of the values of the predetermined characteristic from the copy.

The test image may comprise a gray scale and the generating step can involve forming the test image electronically. The altering step may be performed in such a manner as to achieve gray balance.

A characteristic line can constitute a base characteristic line and the respective altering step can then involve calculating a new characteristic line from the base characteristic line. Calculation of the new characteristic line may include applying a correction function to the base characteristic line and such correction function may be a polynomial. The correction function may contain a plurality of variables and at least one of these variables preferably varies discontinuously, i.e., in discrete steps. The correction function can take the form $$a(g)=b\times(cg^m+dg^n)+e$$

where:

g is a density value for one of the primary colors red, green and blue, b, m and n are variables, and c, d and e are constants.

Another aspect of the invention resides in a copying apparatus, particularly for making copies on photographic color copy material. The apparatus comprises means, e.g., a look-up-table, containing data for at least one characteristic line, and means for altering the data. Preferably, the containing means includes data for three characteristic lines which respectively correspond to the primary colors red, green and blue.

The apparatus may further comprise exposure means operatively associated with the containing means. The apparatus advantageously also includes means for measuring a predetermined characteristic, such as the density, of a test copy.

The apparatus of the invention is particularly well-suited for carrying out the method according to the invention.

The method and apparatus of the invention make it possible to achieve true color reproduction in color copies.

BRIEF DESCRIPTION OF THE DRAWING

Other features and advantages of the invention will be forthcoming from the following description of certain presently preferred embodiments when read in conjunction with the accompanying drawings.

DESCRIPTION OF PREFERRED EMBODIMENTS

Figure 1:
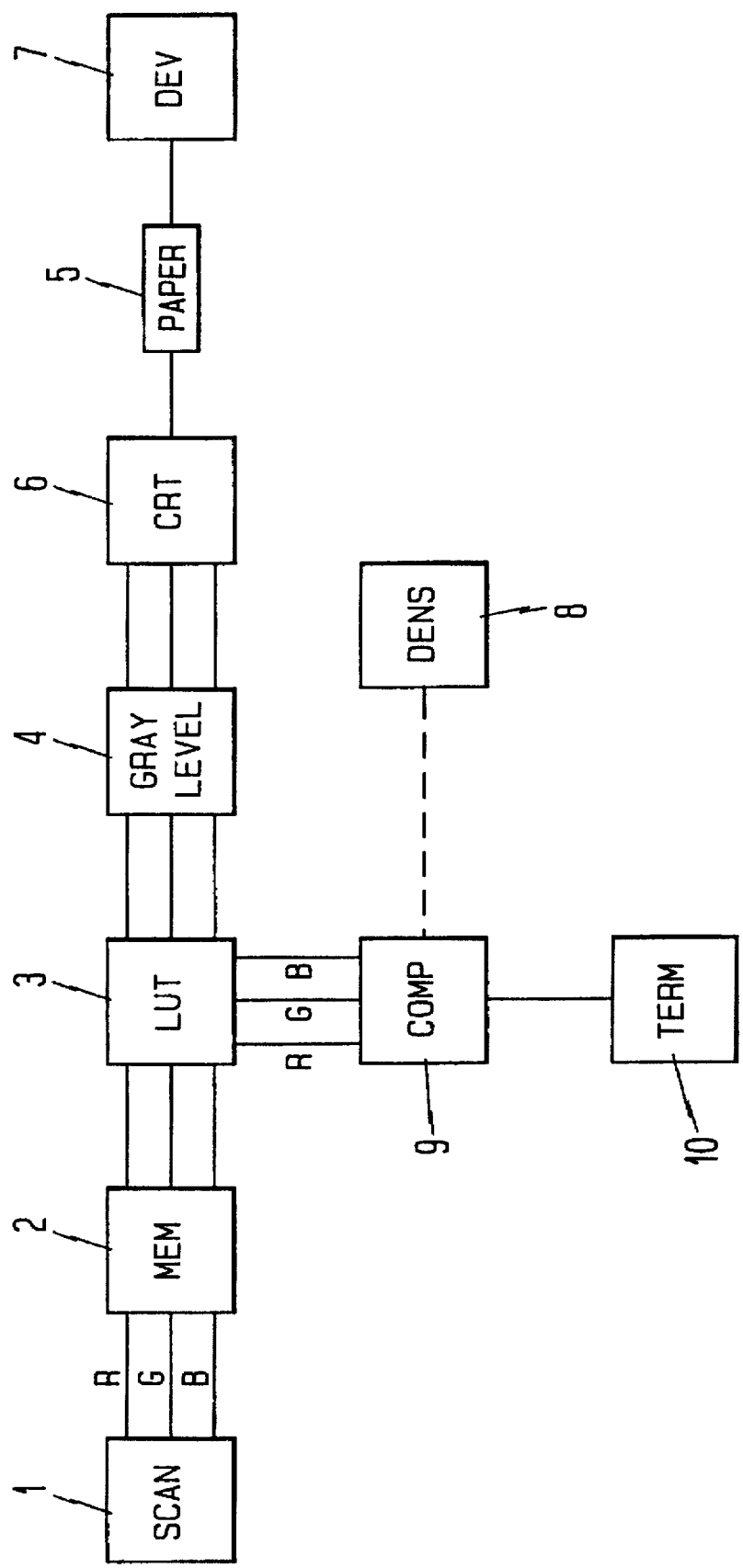
FIG. 1 is a block diagram of a copying apparatus in accordance with the invention.

Referring to FIG. 1, this shows a copying apparatus having an electrooptical or optoelectronic scanner 1 serving to scan a master or original, e.g., a diapositive, to be copied. The scanner 1 includes a linear sensor in the form of a CCD which is moved across one of the major surfaces of the master in a direction normal to the linear extension of the sensor. The scanner 1 electrooptically scans the master at a multiplicity of image points defining a series of rows and columns.

When the master is colored as is here assumed to be the case, the master is scanned three times in succession, once in each of the primary colors red, green and blue. To this end, appropriate color filters are successively moved into the path of the light used for scanning. During each of the three scans, the scanner 1 generates an electrical, analog imaging signal proportional to the density of the master in the respective color for every one of the image points. As indicated by the symbols R (red), G (green) and B (blue), the red, green and blue imaging or density signals are assigned to respective color channels.

The master is scanned at 2,048 image points per row and along 1,024 columns. Thus, the electrooptical image obtained upon scanning consists of 3 ×2,048 ×1,024 imaging signals. The imaging signals derived from the scanner 1 are digitized and then stored in a memory 2.

The digitized signals are retrieved from the memory 2 and sent through an image processing arrangement. For the sake of clearer illustration, only those components of the processing arrangement necessary for an understanding of the invention are shown and described. However, this is not intended to rule out the use of additional components.

From the memory 2, the imaging signals are transmitted to a look-up-table or LUT 3 where the imaging signals undergo a transformation. The transformed imaging signals enter a gray balance regulating unit 4 and are subsequently forwarded to a cathode ray tube or CRT 6. The CRT 6 exposes photographic color copy material 5, e.g., color negative paper, to thereby form a latent of the master on the copy material 5. Following exposure, the copy material 5 is processed in a developing unit 7 to produce a finished copy of the master.

The LUT 3 is adjusted to the sensitivity of the copy material 5 and contains three sets of data, one for each of the primary colors red, green and blue. Each set of data defines a non-linear characteristic line for the respective color. The characteristic lines function to modify the imaging signals for the same color, that is, to transform incoming imaging signals into outgoing imaging signals.

The LUT 3 is connected to a computer 9. The computer 9 is connectible to an input terminal 10 as well as to a densitometer 8.

The LUT 3 and gray balance regulating unit 4 enable gray balance of the copying apparatus to be achieved. To this end, a test image is either read into the copying apparatus by way of the scanner 1 or is electronically generated by the computer 9 as a synthetic image. The test image can, for instance, take the form of a gray scale having specified shades of gray.

The test image is carried by test imaging signals which represent definite color proportions, and these test signals are passed through the image processing arrangement including the LUT 3 and the regulating unit 4. The processed test signals are converted into a test copy by the CRT 6. This test copy is visually inspected for color casts or is measured by the densitometer 8 to determine the color densities thereof, i.e., the red, green and blue densities, at one or more points.

If densitometric measurement establishes that the red, green and blue densities are not equal, a color cast is generally present. However, individual subjective criteria such as, for example, a desired light red cast, can influence inspection of the test copy.

The deviation of a measured color density value from a fixed reference value constitutes a measure of color cast. In accordance with the measurements obtained at a selected point of the test copy, an initial gray adjustment is made by resetting the regulating unit 4 in each color so that all three color densities assume the reference value. If necessary, this initial adjustment is repeated one or more times for additional selected points of the test copy. Subsequently, another test copy of the test image is made and the color cast, if any, of the second test copy is evaluated at one or more points which do not correspond to the selected point or points of the first test copy. If a color density value of the second test copy deviates from the reference value, a second gray adjustment is performed based on the difference between the reference value and such color density value. This second gray adjustment involves the calculation of a new characteristic line by the computer 9 for each of the primary colors red, green and blue.

Figure 2:
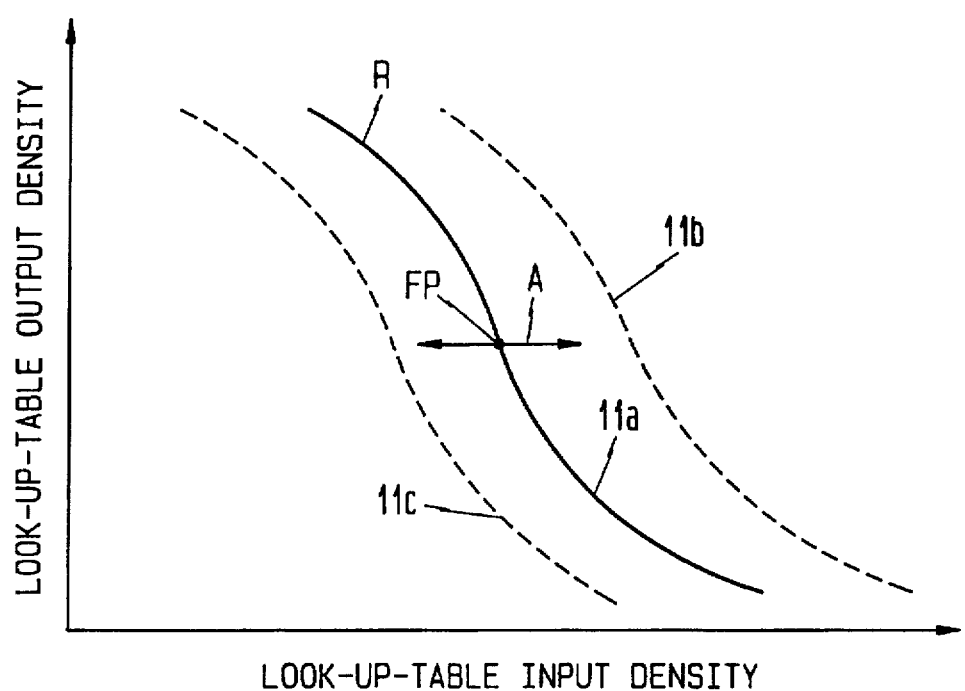
FIG. 2 shows a characteristic line stored in a look-up-table constituting part of the apparatus of FIG. 1.

During the initial gray adjustment, the characteristic lines stored in the LUT 3 are modified. FIG. 2 graphically illustrates one of these characteristic lines, namely, the characteristic line 11a for the color red, and also shows how this characteristic line 11a is modified by the initial gray adjustment. In FIG. 2, the abscissa represents density values at the input side of the LUT 3 while the ordinate represents density values at the output side of the LUT 3.

Imaging signals entering the LUT 3 by way of the red channel are modified in accordance with the characteristic line 11a. The regulating unit 4 is designed to shift the characteristic line 11a in the direction of the double-headed arrow A between two limit lines 11b and 11c. The initial gray adjustment involves a shift of the characteristic line 11a along the directions indicated by the arrow A.

Figure 3:
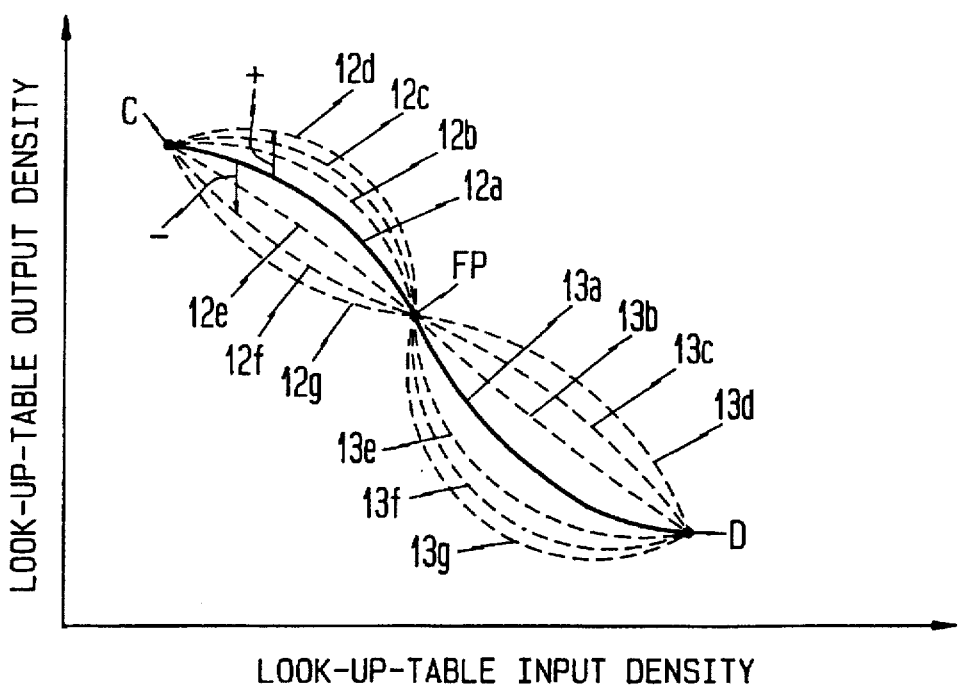
FIG. 3 illustrates possible alterations, according to the invention, in the characteristic line of FIG. 2.

By shifting the characteristic lines in the three color channels as shown for the characteristic line 11a, the test imaging signals corresponding to a fixed gray point or value FP can be adjusted so that the respective point or points of the test image are neutral gray. However, this provides no assurance that the remaining test imaging signals corresponding to other gray values will yield neutral gray reproductions. In order to insure that this is the case, the second gray adjustment is carried out as illustrated in FIG. 3. FIG. 3 is similar to FIG. 2 and again graphically illustrates the characteristic line for the color red. In FIG. 3, the unbroken line corresponds to the characteristic line 11a of FIG. 2. This unbroken characteristic line which, in FIG. 3, is shown as including a first segment 12a to one side of the fixed point FP and a second segment 13a to the other side of the fixed point FP, constitutes a standard or base characteristic line. During the second gray adjustment, the regulating unit 4 is fixed and a new characteristic line is calculated by the computer 9 from the standard characteristic line 12a,13a. To this end, a correction function in the form of a polynomial is superimposed on each of the segments 12a and 13a of the characteristic line 12a,13a. Depending upon the polynomial, the segment 12a is modified to yield a new segment 12b, 12c, 12d, 12e, 12f or 12g while the segment 13a is modified to yield a new segment 13b, 13c, 13d, 13e, 13f or 13g. The newly calculated segment 12b, 12c, 12d, 12e, 12f or 12g, as well as the newly calculated segment 13b, 13c, 13d, 13e, 13f or 13g, are then stored. The standard segments 12a and 13a always remain stored in the computer 9.

A polynomial of the following form is used to calculate a new characteristic line:

$$a(g) = b \times (cg^m + dg^n) + e$$

where:

g is a color density or a density difference, c, d and e are constants, and b, m and n are variables.

The variables b, m and n vary discontinuously or stepwise and assume a limited number of values. The values for a variable b, m or n differ from one another to a degree which corresponds to the differentiating capacity of the eye for the results obtained on a test copy.

The computer 9 calculates a new characteristic line for each of the color channels during the second gray adjustment.

It is of advantage for the second gray adjustment to be carried out in such a manner that all of the characteristic lines are shifted in the same direction. With reference to FIG. 3, it is thus advantageous for all of the characteristic lines to be shifted upwards as at plus (+) or for all of the characteristic lines to be shifted downwards as at minus (−). This makes it possible to reduce or eliminate color play, i.e., density-dependent color casts in different colors.

In combination with the initial gray adjustment, it is also highly advantageous, when recalculating the characteristic lines during the second gray adjustment, for the fixed points FP of all three characteristic lines to have the same color density value, i.e., for all three characteristic lines to have a common fixed point FP. It is especially favorable for the common fixed point FP to assume the value measured during the initial gray adjustment.

Based on the assumption that the standard characteristic line 12a,13a is roughly adjusted to the copying conditions, it is of advantage to provide additional fixed points C and D at the ends of the respective segments 12a and 13a remote from the fixed point FP. The new characteristic line calculated from the standard characteristic line 12a,13a then does not depart from the latter unduly. An undue departure of the new characteristic line from the standard characteristic line 12a,13a can be further inhibited by setting upper and lower limits for the variables b, m and n in the polynomial a(g).

It is additionally advantageous to optimize the portion of the characteristic line 12a,13a between the fixed points C and FP separately from the portion between the fixed points FP and D. In other words, it is of advantage to balance the segments 12a and 13a separately.

Various modifications can be made within the meaning and range of equivalence of the appended claims.

We claim:

1. A method of adjusting a copying apparatus, particularly a copier for making copies on photographic color copy material, comprising the steps of generating test signals each of which represents a discrete location of a predetermined test image; making a first adjustment using at least some of said test signals; and subsequently making a second adjustment using at least some of said test signals, the step of making said first adjustment including operating on at least some of said test signals with at least one characteristic line to obtain a first modified test image, evaluating a property of said first modified test image at a selected location of said first modified test image corresponding to a predetermined point of said one characteristic line, and shifting said one characteristic line when said property exhibits a predetermined deviation from a desired standard so as to at least partly compensate for said predetermined deviation, the step of making said second adjustment including operating on at least some of said test signals with the shifted characteristic line to obtain a second modified test image, evaluating a property of said second modified test image at a first location of said second modified test image different from said selected location and corresponding to a first point of said shifted characteristic line different from said predetermined point, evaluating a property of said second modified test image at a second location of said second modified test image different from said selected location and corresponding to a second point of said shifted characteristic line different from said predetermined point, and altering said shifted characteristic line when the evaluated property of at least one of said first and second locations has a preselected deviation from a desired standard, said altering being performed in such a manner that said predetermined point remains approximately fixed.

2. The method of claim 1, wherein said altering step is performed so as to achieve gray balance.

3. The method of claim 1, wherein said one characteristic line is non-linear.

4. The method of claim 1, further comprising the steps of making a copy of said first modified test image, and making a copy of said second modified test image, each evaluation being performed on the respective copy.

5. The method of claim 1, wherein said one characteristic line corresponds to one of the primary colors red, green and blue, said steps being performed for the other two primary colors using respective additional characteristic lines.

6. The method of claim 5, wherein said predetermined point is common to all of said characteristic lines.

7. The method of claim 1, wherein said predetermined test image comprises a gray scale.

8. The method of claim 1, wherein said generating comprises forming said predetermined test image electronically.

9. The method of claim 1, wherein said altering comprises calculating a new characteristic line from said shifted characteristic line.

10. The method of claim 1, wherein said altering comprises applying a correction function to said shifted characteristic line.

11. The method of claim 10, wherein said correction function comprises a polynomial.

12. The method of claim 10, wherein said correction function comprises a plurality of variables.

13. The method of claim 10, wherein said correction function comprises at least one variable which varies discontinuously.

14. The method of claim 10, wherein said correction function has the form $$a(g)=b \times (cg^m + dg^n) + e$$

where:

g is a density value for one of the primary colors red, green and blue, b, m and n are variables, and c, d and e are constants.

15. The method of claim 1, wherein said shifted characteristic line has three points which remain substantially unchanged during said altering.

16. A copying apparatus, particularly for making copies on photographic color copy material, comprising means for containing data for at least one characteristic line; means for changing said data so as to shift said one characteristic line; and means for altering the changed data in such a manner that at least one point of the shifted characteristic line is displaced while at least one other point of said shifted characteristic line remains approximately fixed; means for generating at least one set of test signals each of which represents a discrete location of a predetermined test image, means for sending the test signals of said one set to said data containing means for modification of the test signals and the predetermined test image, and means for comparing a value of a predetermined characteristic of the modified test image at a first location with a reference value and for comparing a value of the predetermined characteristic at a second location with a reference value, said other point of said shifted characteristic line corresponding to the first location of the modified test image and said one point of said shifted characteristic line corresponding to the second location of the modified test image, and said altering means being designed so that, when the values for the first location are substantially equal and the values for the second location are unequal, said one point is displaced while said other point remains approximately fixed.

17. The apparatus of claim 16, further comprising exposure means operatively associated with said containing means.

18. The apparatus of claim 16, wherein said one characteristic line corresponds to one of the primary colors red, green and blue, said containing means including data for two additional characteristic lines which respectively correspond to the other primary colors.

19. The apparatus of claim 16, wherein said containing means comprises a look-up-table.

20. The apparatus of claim 16, further comprising means for making test copies, and means for measuring the densities of the test copies, said making means being operatively associated with said containing means.

21. The apparatus of claim 16, wherein said generating means is designed to generate test signals representing a gray scale.

22. The apparatus of claim 16, wherein said generating means is electronic.

23. The apparatus of claim 16, wherein said one characteristic line corresponds to one of the primary colors red, green and blue, said containing means including data for two additional characteristic lines which respectively correspond to the other primary colors, and said changing means being designed to change the data for each characteristic line of said containing means in such a manner that the respective characteristic line is shifted and that said other point is common to all of the shifted characteristic lines.

24. The apparatus of claim 16, wherein said altering means is designed to calculate a new characteristic line from said shifted characteristic line.

25. The apparatus of claim 16, wherein said altering means is designed to apply a correction function to said shifted characteristic line.

26. The apparatus of claim 25, wherein said correction function comprises a polynomial.

27. The apparatus of claim 25, wherein said correction function comprises a plurality of variables.

28. The apparatus of claim 25, wherein said correction function comprises at least one variable which varies discontinuously.

29. The apparatus of claim 25, wherein said correction function has the form $$a(g)=b \times (cg^m + dg^n) + e$$

where:

g is a density value for one of the primary colors red, green and blue, b, m and n are variables, and c, d and e are constants.

30. The apparatus of claim 16, wherein said altering means is designed to achieve gray balance.

31. The apparatus of claim 16, wherein said one characteristic line is non-linear.

32. The method of claim 1, wherein the property evaluated during each evaluation is color.

33. The method of claim 1, wherein the property evaluated during each evaluation is density.

* * * * *